United States Patent [19]

Zambelli

[11] Patent Number: 4,577,960
[45] Date of Patent: Mar. 25, 1986

[54] DOCUMENT REGISTRATION APPARATUS
[75] Inventor: Robert G. Zambelli, Rochester, N.Y.
[73] Assignee: Xerox Corporation, Stamford, Conn.
[21] Appl. No.: 643,121
[22] Filed: Aug. 22, 1984
[51] Int. Cl.$^4$ ............................................. G03B 27/62
[52] U.S. Cl. ....................................... 355/75; 355/133
[58] Field of Search ............................ 355/75, 59, 133

[56] References Cited

U.S. PATENT DOCUMENTS

| | | | |
|---|---|---|---|
| 3,630,611 | 12/1971 | Hoyer | 355/75 |
| 3,740,131 | 6/1973 | Hirose | 355/75 |
| 4,190,358 | 2/1980 | Sasuga | 355/75 |
| 4,433,909 | 2/1984 | Goes In Center et al. | 355/75 |

Primary Examiner—Richard A. Wintercorn
Attorney, Agent, or Firm—Joseph R. Sakmyster

[57] ABSTRACT

A platen cover used in a document reproduction machine is provided with a mechanism for selectively engaging and disengaging a movable registration guide from the platen surface. The movable registration guide cooperates with a fixed guide to provide a corner registered edge for positioning of one size document. For larger documents, the movable guide is engaged by the platen cover and pivoted therewith to permit the larger document to be placed on the platen in a new position which maintains optical system center line.

4 Claims, 8 Drawing Figures

DOCUMENT REGISTRATION APPARATUS

BACKGROUND OF THE INVENTION

This invention relates to a document registration apparatus for use in a document reproduction machine in which different size original documents are placed on a transparent platen and an image projected along the optical centerline of the machine imaging system. From a human factors perspective, the optimum positioning for a document on the platen surface is to align a document edge along a corresponding corner edge of the platen. The projected image of the document, as formed on the photoreceptor, has a known center line on the photoreceptor which is then used as the reference point for the subsequent xerographic operations. It is desirable to maintain this center line irrespective of the size of the document to be copied or the specific magnification value selected.

FIG. 1 illustrates the problem encountered in copying documents of different sizes. The figure shows a top view of a transparent document platen 10. In a conventional manual document reproduction mode, a fixed registration edge or edges extend linearly along one or two sides of the top surface of a document platen. These edges provide either center or corner registration with two orthogonal edges of the document aligned with two orthogonal registration lines of the copier platen. This registration provides alignment of the original document with the optical system and copy sheet registration of the particular reproduction device employed. For a machine having the capability of reproducing documents of differing dimension, either at 1:1 magnification, or at a reduced or enlarged magnification, the position on the platen, document and hence the registration edges, must be changed to maintain the center line of the document aligned with the optical system centerline. This problem is illustrated by reference to FIG. 1 which shows a top view of a transparent platen 10 utilizing a pair of registration guides 12, 14 to provide a lower left corner registration edge 16. A letter size document 18 with a width of 8½" in the Y direction placed on the platen in the corner registered position, will have its center line CL(Y) coincident with the optical system centerline. However, as one example, if a larger size document, such as a computer printout 20 with a width of 10½' in the Y direction is placed in the corner registration position, the centerline CL(Y') of this document will be 2" above the optical center line required, hence the latent image formed at a photoconductor surface will be misaligned.

It is therefore an object of the invention to provide a registration mechanism which is sufficiently versatile to accomodate changes on document size while maintaining optical alignment. This object is realized by providing in a document reproduction apparatus having a transparent platen for supporting a document to be copied, at least one document registration edge associated with said platen, a pivotable cover, and an optical projection system for projecting light images of said document from said platen to a photosensitive member, the improvement comprising: means for selectively engaging at least one of said registration edges with said platen cover whereby, upon engagement, said registration edge is moved from a position in optical alignment with said projection means to a position out of alignment with the projection means.

DRAWINGS

DESCRIPTION

Figure 2:
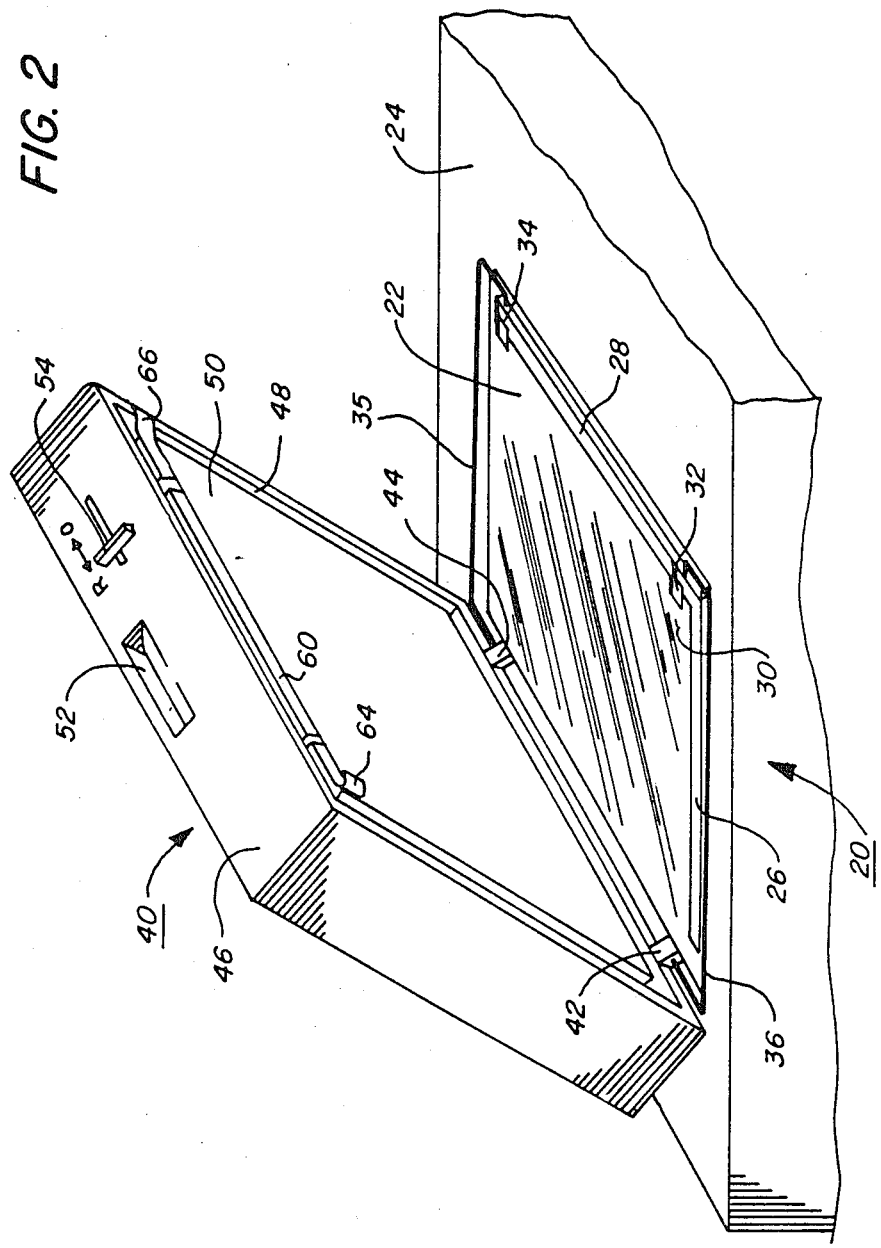
FIG. 2 is a top perspective view of a platen cover modified to engage or disengage a movable registration guide according to the principles of the present invention.

Referring now to FIG. 2, there is shown a top perspective view of a document support station 20 modified according to the principles of the present invention. A transparent document platen 22 is mounted within an aperture formed in a document reproduction machine. The platen has a pair of registration guides 26, 28 whose intersection forms a corner registration edge 30. Guide 26 is mounted in a fixed position on the platen while guide 28 is movable. Guide 28 has a pair of edge hooks 32, 34 mounted on the ends thereof, for a purpose to be described below.

Platen cover 40 is pivotably mounted to surface 24 by pivot members 42, 44. Cover 40, when placed in the closed (down) position fixedly holds a document placed in registration position on platen 22. In this registered position, the informational area of the original document can be projected onto a photosensitive surface to form a latent image of the document thereon. Subsequently, the latent image is developed with appropriate marking material and the image is permanently affixed therto. These xerographic functions are well known in the art, as described, for example in U.S. Pat. No. 4,318,610 whose contents are hereby incorporated by reference.

Platen cover 40 comprises a box-like housing 46 having an inner chamber 48. A white reflective member 50 is mounted within chamber 48 and is adapted to completely overlie the surface of platen 22 except for the area covered by guides 26, 28. The bottom surface of the guide members would preferably have the same white reflective surface as member 50. Mounted on the front cover 40 is a fixed handle 52 and a movable registration control 54. Mounted within chamber 48 is a latch link mechanism 60. Mechanism 60 is movable by control 54 to selectively engage and disengage pivotable guide 28. This engagement is shown in detail in FIG. 3.

Figure 3:
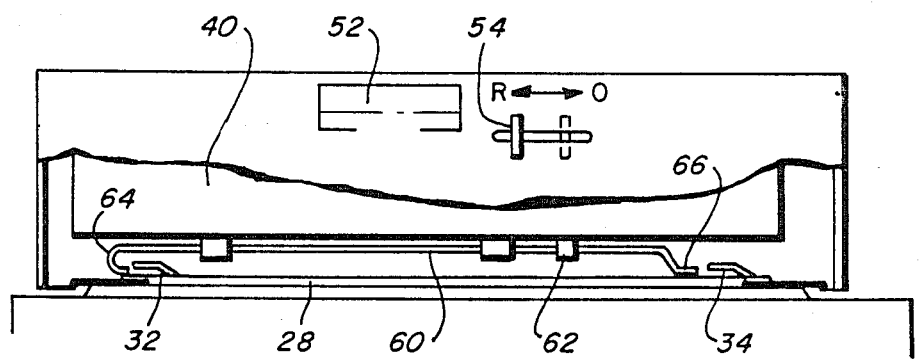
FIG. 3 is a front view of the platen station showing the platen cover in a closed position and registration guide in a non-engaged position.

FIG. 3 shows a frontal view of support station 20 showing platen cover 40 in a closed position. Control 54 is in a position coinciding with the reproduction, for example, of an 8½"×11" (R) document. The control is fixedly attached to latch 60 by means of latch rod 62.

Figure 4:
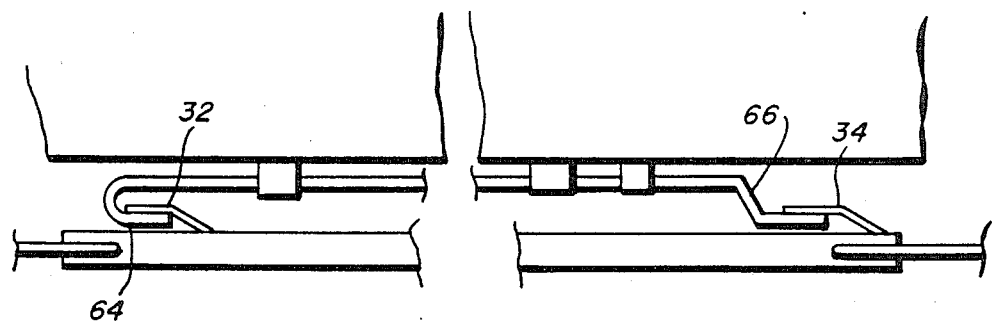
FIG. 4 is the view of FIG. 3 showing the registration guide in an engaged position.

Latch 60 has, on one end, a curled, hook engagement edge 64. On the other end, the edge has been bent downward and straightened to form a second hook engagement edge 66. As shown in FIG. 3, control 54, is in the solid line (disengaged) position. In this position, edges 64, 66 are out of engagement with registration guide edge hooks 32, 34 and registration guide 28 is in the registration position associated with the copying of the "R" document. In the event that an oversize (O) document is to be copied, control 54 is moved to the right to the "O" position. Latch link 60 is moved to the right by the same action causing edges 64, 66 to engage edge hooks 32, 34. This engaged condition is shown in FIG. 4. Registration guide 28 is now in a position to be removed from the platen surface. As the operator grasps handle 52 to pivot cover 40 upward to its open position, guide 28, fastened by support ams 35, 36 pivots with the cover along the same pivot line. Arms 35, 36 are connected to the back of the cover along the pivot axis.

Figure 5:
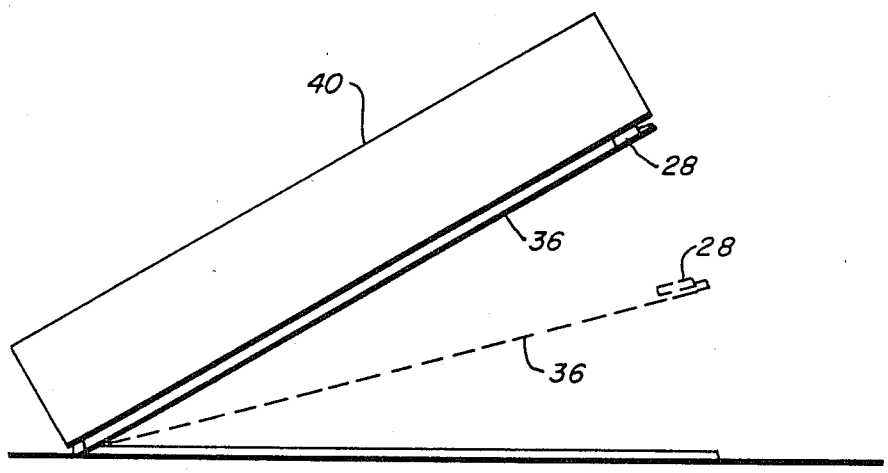
FIG. 5 is a side schematic position view showing the platen cover, with engaged registration guide, in an intermediate and in a fully open, position.

FIG. 5 shows, schematically, the platen cover with retained guide, in an intermediate (dotted) and fully open position.

Figure 1:
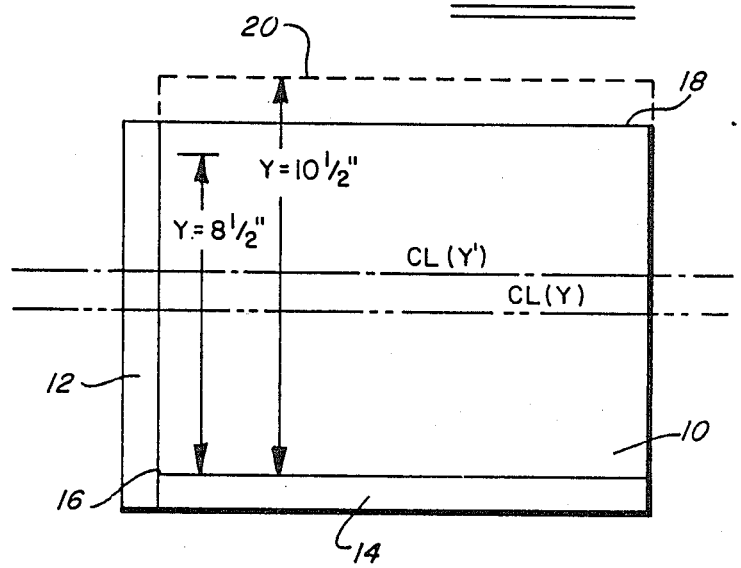
FIG. 1 is a top view of a prior art document platen.
Figure 6:
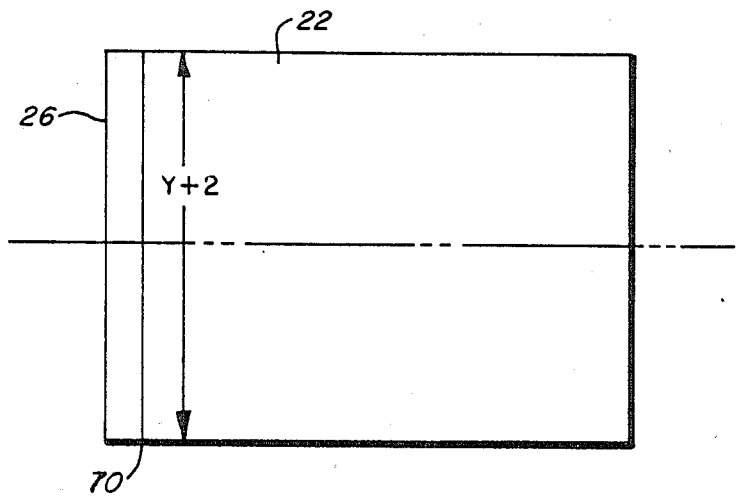
FIG. 6 is a top view of the platen showing the new corner registration position for an oversize document.

The operator is then free to place the oversize document on the platen and proceed to reproduce either with the cover up or down and in a 1X mode or at some magnification. The oversize document is then corner-registered against a second corner 70 formed at the intersection of guide 26 and the platen edge as shown in FIG. 6. When the oversize document copying mode is completed, cover 40 is lowered and control knob 54 returned to the R position, disengaging link mechanism 60 from the guide edge handle leaving guide 28 in its original position.

The dimensions of guide 28 are determined by the sizes of the documents to be copied. In the example previously given, if guide 28 has a width of one inch, removal of the guide, and subsequent placement of the two inch wider computer forms document will result in the center line being maintained at the original line CL as shown in FIG. 6. Of course, a plurality of movable registration guides of differing dimensions may be utilized according to the principles of the present invention. A specific guide would be associated with a specific document copying mode. The dimensions of original documents which can be reproduced is limited only by the size of the platen surface.

Figure 7:
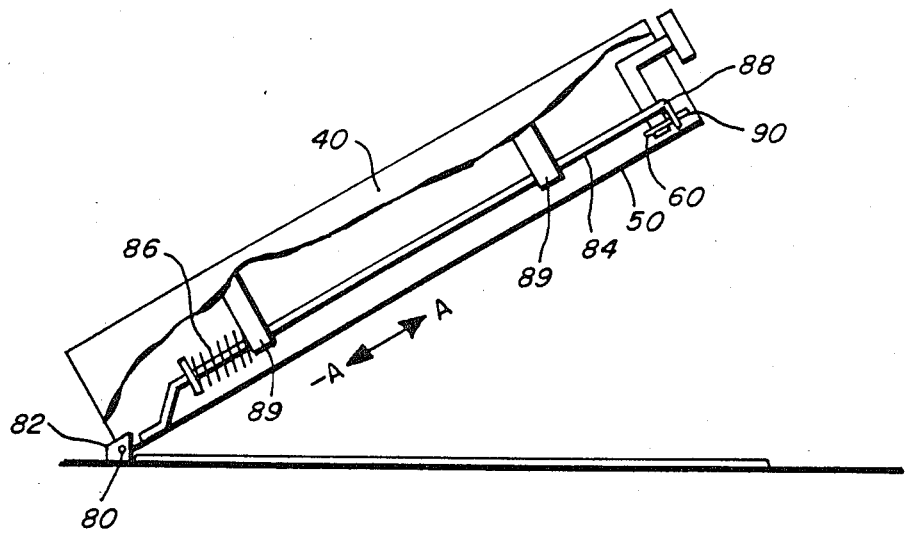
FIG. 7 shows a side view of a platen cover mechanism for preventing movement of an engaged registration guide.
Figure 8:
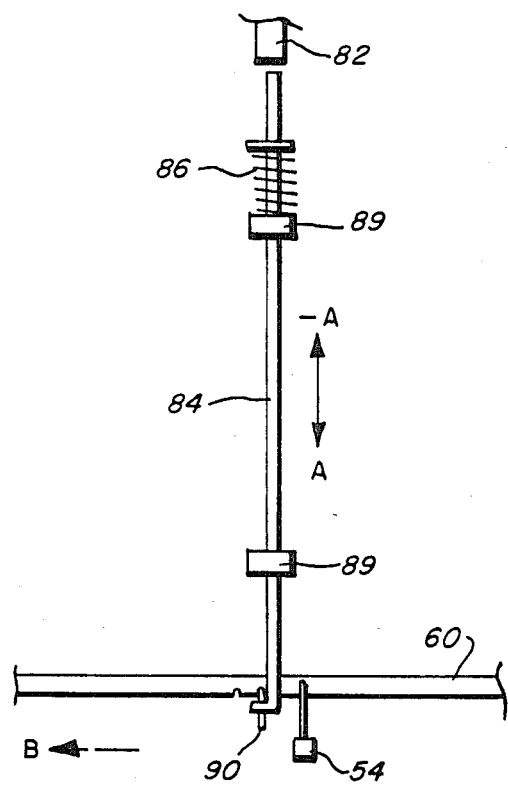
FIG. 8 is a top view of the FIG. 7 mechanism.

FIGS. 7 and 8 show a variation of the platen cover construction which ensures that the latch hook does not move during cover movement in the engaged position. As shown in FIG. 7, cover 40 is pivoted upward about pivot point 80 operating against stop 82. A blocking rod 84 is movably mounted in the —A, A direction shown within chamber 48 and behind reflector member 50. Rod 84 is urged in the —A direction by spring 86 acting against stop 89 as the platen cover is opened. The end 88 of rod 84, frictionally engages a protrusion 90 formed on latch link 60, thus preventing disengagement of the link edges from the attached guide. As the cover is closed, rod 84 is urged in the A direction by coming in contact with stop 82. Protrusion 90 is now free to move in directin B (FIG. 8) and the guide can be returned to the platen surface.

In conclusion, it may be seen that there has been disclosed an improved document reproduction system. The exemplary embodiments described herein are preferred. However, it is contemplated that further variations and modifications within the purview of those skilled in the art can be made herein. For example, instead of guide 28 having a white reflective surface, the guide, or a series of guides, could have information placed thereon. This variation would permit the imaging of, for example, a logo or other identification, along the document edge. The following claims are intended to cover all such variations and modifications as fall within the spirit and scope of the invention.

What is claimed is:

1. In an electrophotographic document reproduction apparatus which includes a transparent document support platen and an optical projection system for projecting light images of said document from said platen to said photosensitive member, a document registration apparatus comprising:
   at least one movable document registration guide associated with said platen, and
   a pivotable platen cover assembly including mechanical engagement means for selectively engaging at least one of said registration guides whereby upon engagement, a pivoting movement of said cover conveys said registration guide into and out of optical alignment with the projection means.

2. The improved apparatus of claim 1 wherein said engagement means includes a pair of support arms mounted within said platen cover, said arms having end projections adapted to selectively engage said registration guide whereby, when the platen cover is raised, said guide is lifted from said platen and acquires the same motion as the platen cover.

3. The improved apparatus of claim 2 further including means for securing the engaged position of said guide.

4. The improved apparatus of claim 1 wherein said registration guide has information formed on the surface in contact with the platen; said information projected with the light images of said document to form a composite latent image at the photosensitive surface.

* * * * *